Figure 1:
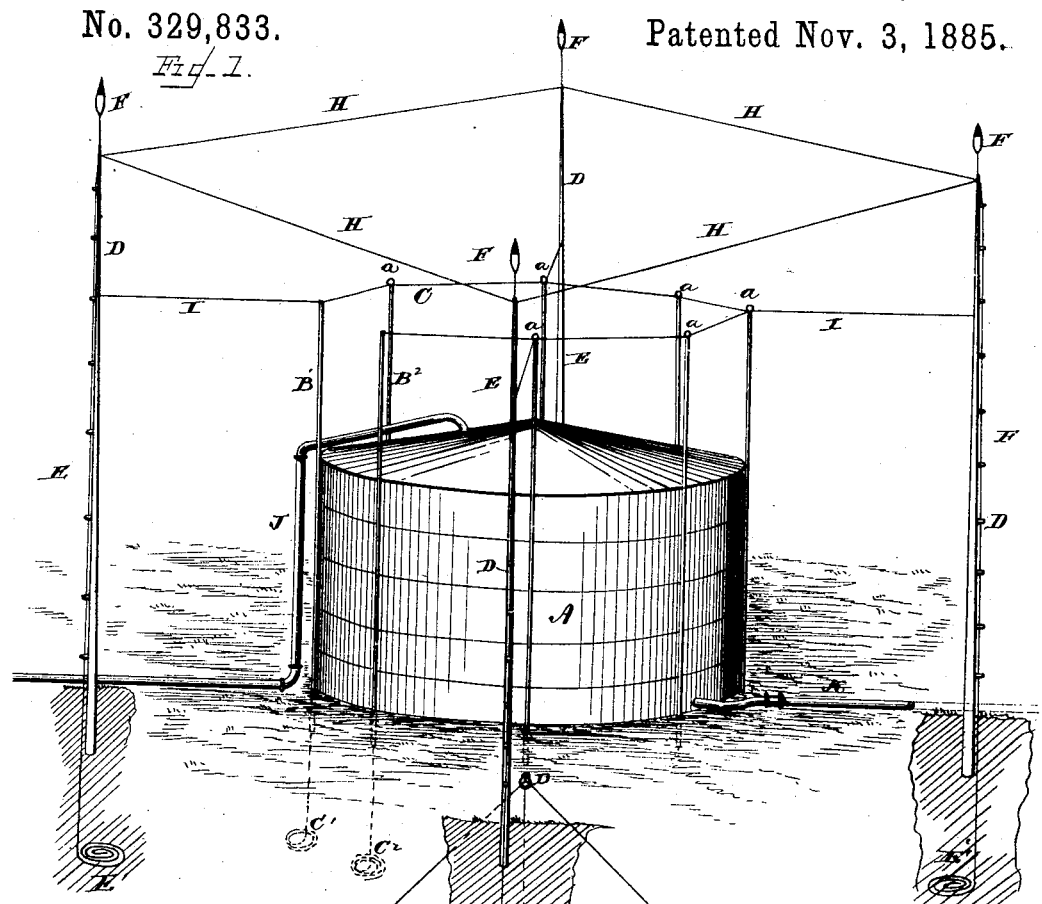

(No Model.)

C. J. HUBBELL.
APPARATUS FOR PROTECTING STRUCTURES FROM LIGHTNING.

No. 329,833. Patented Nov. 3, 1885.

WITNESSES
J. L. Ourand
E. A. Finckel

INVENTOR
Charles J. Hubbell
by Wm. N. Finckel,
his Attorney.

UNITED STATES PATENT OFFICE.

CHARLES J. HUBBELL, OF WASHINGTON, DISTRICT OF COLUMBIA.

APPARATUS FOR PROTECTING STRUCTURES FROM LIGHTNING.

SPECIFICATION forming part of Letters Patent No. 329,833, dated November 3, 1885.

Application filed March 24, 1885. Serial No. 159,963. (No model.)

*To all whom it may concern:*

Be it known that I, CHARLES JONES HUBBELL, a subject of the Queen of Great Britain, but having declared my intention of becoming a citizen of the United States, residing at Washington, in the District of Columbia, have invented a certain new and useful Improved System for Protecting Receivers of Inflammable or Explosive Substances, of which the following is a full, clear, and exact description.

It is a well-known law of physics that when, during a thunder-storm, a cloud charged with a given kind of electricity approaches the earth the latter in the immediate vicinity becomes charged by induction with an opposite electricity. While the storm-cloud exercises everywhere below it its attractive influence upon the electric fluid of an opposite character, the subterranean sheet or moisture-belt receives this influence in the greatest degree. Then all its upper surface is charged with an electricity contrary to the cloud, and which is accumulated there by its attraction, and if, for example, there be located here an oil-tank, or oil be otherwise accumulated, as frequently occurs in the oil regions, the addition to the atmosphere of the hydrocarbon vapors makes it exceedingly susceptible to a lightning-stroke or electric spark, more especially so since hydrocarbon is an excellent conductor of electricity. Now, if these dangerous conditions can be controlled it is obvious that highly inflammable and explosive substances can be housed with little risk from danger by atmospheric electricity; and my invention is directed to this end. I may observe that this field is not altogether unexplored so far as providing oil-tanks, powder-magazines, and the like with lightning arresters or conductors is concerned.

In my invention I surround the structure to be protected by a number of poles of greater height than the structure and in electric contact therewith, and I extend from the subterranean sheet a copper cable, coiled therein to get an extended earth-terminal, up one of said poles, and string it from the top of one to the other until it is brought back to the pole next the starting-pole, and then bury it again in a coil in said subterranean sheet to make a circuit. Combined with this system of electrically-connected poles is a second series of poles, about twenty feet from them and extending high above the first series, and each having a copper cable with a large earth-terminal buried, as before, but terminating some distance above the pole in a platinum point, the several cables of said last-named poles being connected in a circuit at the top of the poles by a copper cable, and each cable of said poles independently connected to the circuit of the first series of poles, and the said second cables being electrically connected with a metallic portion of the receiver to which the system is applied, the whole serving to cause the attracted electricity of the earth permeating the surface of the earth and attracted structures thereon to be drawn to the platinum points, whereby the cloud is ruptured and the decomposed or neutralized electricity of the earth and cloud carried harmless to the subterranean sheet, preventing the stroke or spark, all as I will now proceed to set forth and claim.

Figure 2:
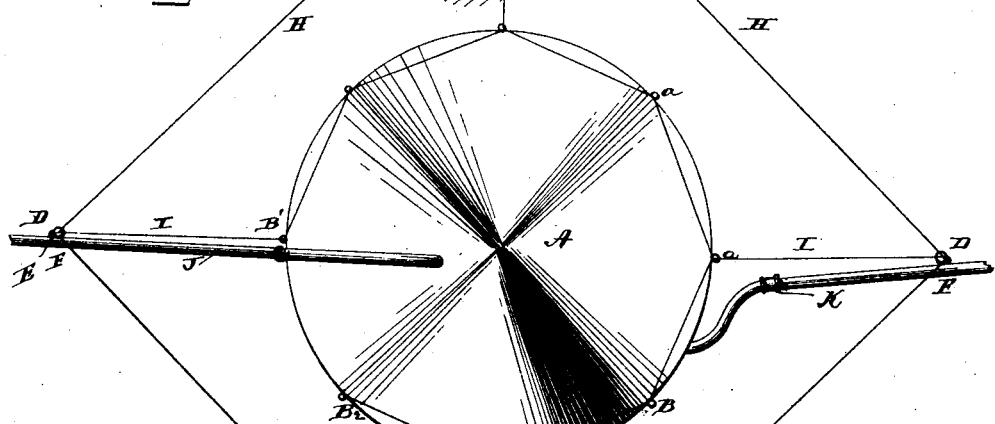

In the accompanying drawings, illustrating my invention, in the two figures of which like parts are similarly designated, Figure 1 is a perspective view of an oil-tank supplied with my system, the earth being shown in section, and Fig. 2 is a top plan view of the same.

In the example chosen for illustrating my invention, A is an oil-tank, of ordinary construction, it being understood, of course, that the invention is applicable to receivers of all kinds of explosive or inflammable materials, liquid, solid or gaseous, such as powder magazines and mills, oil-derricks, and other structures for storage of such substances. I surround the structure with a number of poles, B, preferably of iron tubing, erected in electric contact with the structure, and extending up above the same a distance of about twenty feet, or to a plane where ordinarily the vapors or hydrocarbon gases from an oil-tank are not already diluted with atmospheric oxygen. A copper cable, C, having its end coiled so as to present a large horizontal surface—as an earth-terminal, C'—and buried in the subterranean sheet, is passed up through one, B', of the tubular poles B, and thence extends successively through suitable supports—such as screw-eyes $a$—in the tops of the several poles, to the last, $B^2$, of the series next the starting-pole, and is passed down through said pole $B^2$ to the subterranean sheet, where its end is also extended in a coil, $C^2$. This copper cable thus makes an electric-circuit cordon around and above the top of the tank, which of itself, if provided with points, is quite efficient in averting a lightning-stroke, and, inasmuch as the poles are in metallic contact with the tank and the copper cable, it follows that the best conductor (the cable) must receive the electricity; but, owing to the subtle action of electricity, I deem it essential to arrest the lightning at a more distant point from the structure to be protected, and hence where possible I arrange a second series of conductors at least twenty feet distance from the structure, and this series is composed of four or more poles, D, of suitable material, each having a copper cable, E, attached to it and terminating at one end in a coil, E', in the subterranean sheet, and at the other end in a platinum-tipped copper point, F, raised about three feet above the poles. These poles are preferably about from thirty-five to forty-five feet higher than the structure. Their cables are metallically connected by a horizontal cable, H, stretched from one pole to another, which, with the grounded cables E, makes another circuit. The cables E are also connected by horizontal cables I with the cable C, and are in metallic contact with the inlet (J) and outlet (K) pipes of the tank. The electricity in and about the tank will be taken up by the inner cordon of conductors and conveyed to the outer, with which they are in electrical connection, the latter also gathering such electricity as may be in its vicinage, and it is conveyed to the highest altitudes of the system, where, meeting the storm-cloud containing electricity of opposite polarity, the fluid is decomposed or neutralized by the rupturing of the clouds by the platinum points, and the inert fluid carried to the subterranean sheet. In some instances it may be advisable to put points also on the poles B to thwart erratic movements of atmospheric electricity.

I prefer to make the several metallic connections of the cables by soldering, and the copper cables are of good conducting capacity and usually of not less than three-eighths of an inch in cross-section. The poles may extend to the subterranean sheet, if desired.

Magazines or receptacles for powder now used by the United States Government are generally constructed of stone, with iron girders and roofs, said buildings being usually about three hundred feet long, forty feet wide, and about twenty-five or thirty feet high from the ground to the ridge. In applying my system to such structures I place a series of poles, of wood, or its equivalent, fifty feet in height at a distance of about six feet from the structure to be protected and about sixty feet apart, which would require five poles on either side. Beginning at one of the end poles I coil a copper cable conductor of about three-eighths inch cross-section in a coil of about nine feet in diameter in the subterranean sheet, to insure intimate contact with the latter, and carry the cable up the pole, to which it is properly attached, and thence from pole to pole of the series at the top of each pole to the last one, and down the last to the ground, as before, thereby making an electric-circuit belt. To each of these poles I also attach a vertical cable-conductor, the lower end of which is carried to the subterranean sheet, and coiled, as before explained, and surmount the upper end with a platinum point. Each point of intersection of the horizontal and vertical cables is electrically connected by copper joints and soldering. I also connect the metal roof to the conductor of each pole by a horizontal cable, both ends of which shall be properly secured so as to form a perfect electrical connection, whereby I draw off the induced electricity from the magazine or building to the points, as already set forth, thereby preventing any lateral escape of the fluid from the metal of the structure, which would tend to ignite the combustible matter therein contained.

What I claim is—

1. A system for protecting receivers of inflammable or explosive substances from atmospheric electricity, comprising a cordon of poles extended above such receiver, and provided with a circuit-cable supported upon the upper ends of said poles and in metallic contact with the receiver, and having its ends terminating in coils in the subterranean sheet, combined with a distant cordon of cables of a higher altitude, substantially as set forth.

2. A structure to be protected from lightning, combined with a series of tubular metallic poles immediately surrounding it and in metallic contact therewith, a copper cable terminating in a coil arranged in the subterranean sheet, and extending thence up through one of said poles successively through the tops of the others to the last one next the first, and down it to the subterranean sheet, and ending there in an extended coil, and a distant series of vertical copper cables having coiled earth-terminals and sky platinum points connected to each other by a horizontal cable, and to the inner or first cable by individual cables in metallic contact therewith, and also having metallic connection with the structure, whereby the induced electricity of the earth and the electrically-attractive structures thereon is drawn to the points and neutralized, thereby rupturing the storm cloud, and the decomposed or neutralized electricity of the earth and cloud is carried harmless to the subterranean sheet, preventing the stroke or spark, substantially as described.

3. The combination, with the structure to be protected, of a series of poles provided with a cable extended from a coil in the subterranean sheet to the top of such pole, and from said pole to all the others of the series and down the last of the series to the subterranean sheet, where it terminates in a coil, a series of vertical cables, each coiled in the subterranean sheet and terminating in platinum points above the first-named cable, and in electrical connection therewith, and electrical connections with the structure, substantially as described.

In testimony whereof I have hereunto set my hand this 21st day of March, A. D. 1885.

CHARLES J. HUBBELL.

Witnesses:
WM. H. FINCKEL,
GEO. M. FINCKEL.